United States Patent

Forman

[15] 3,645,480
[45] Feb. 29, 1972

[54] VEHICLE SEAT RESTRAINING SYSTEM

[72] Inventor: David Forman, Centerport, N.Y.
[73] Assignee: Fairchild Industries, Inc., Montgomery County, Md.
[22] Filed: Apr. 20, 1970
[21] Appl. No.: 30,031

[52] U.S. Cl. ................................................. 244/122 AG
[51] Int. Cl. ............................................................ B64d 25/02
[58] Field of Search .................... 244/122, 122.18, 122.2; 297/384, 385, 389; 180/82; 280/150 SB

[56] References Cited

UNITED STATES PATENTS 2,836,382  5/1958  Martin ................................. 244/122
3,191,994  6/1965  Boyce ................................. 244/122 X Primary Examiner—Milton Buchler
Assistant Examiner—Carl A. Rutledge
Attorney—Michael W. York

[57] ABSTRACT

A vehicle seat restraining system that includes one or more electromagnets located on the vehicle seat for magnetically restraining an occupant to the vehicle seat. Magnetically attractive members are also provided that are worn by the occupant that are adapted to be attracted by the electromagnets on the vehicle seat when the magnets are energized. A power source is also provided to energize the electromagnets on the vehicle seat.

13 Claims, 8 Drawing Figures

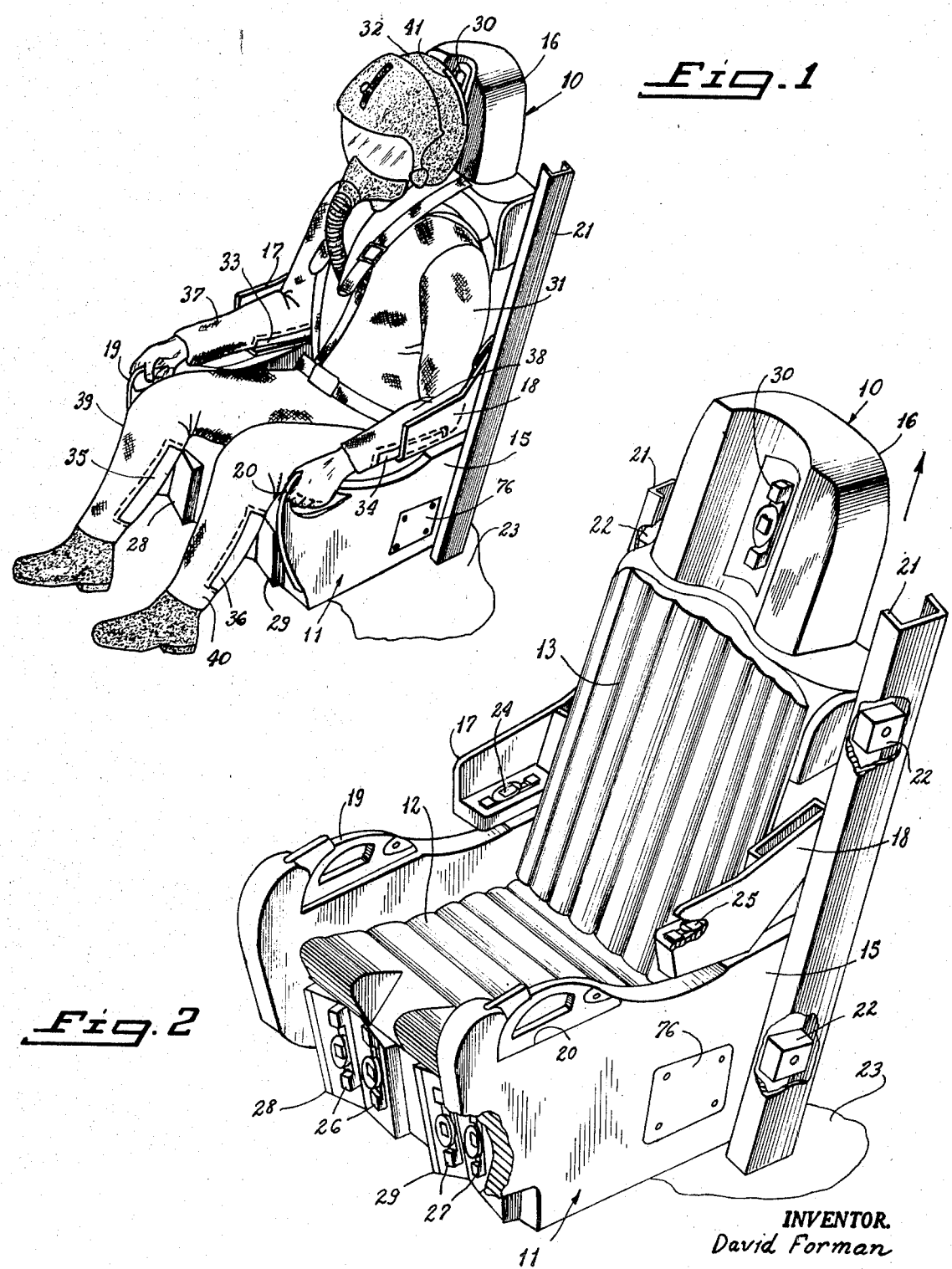

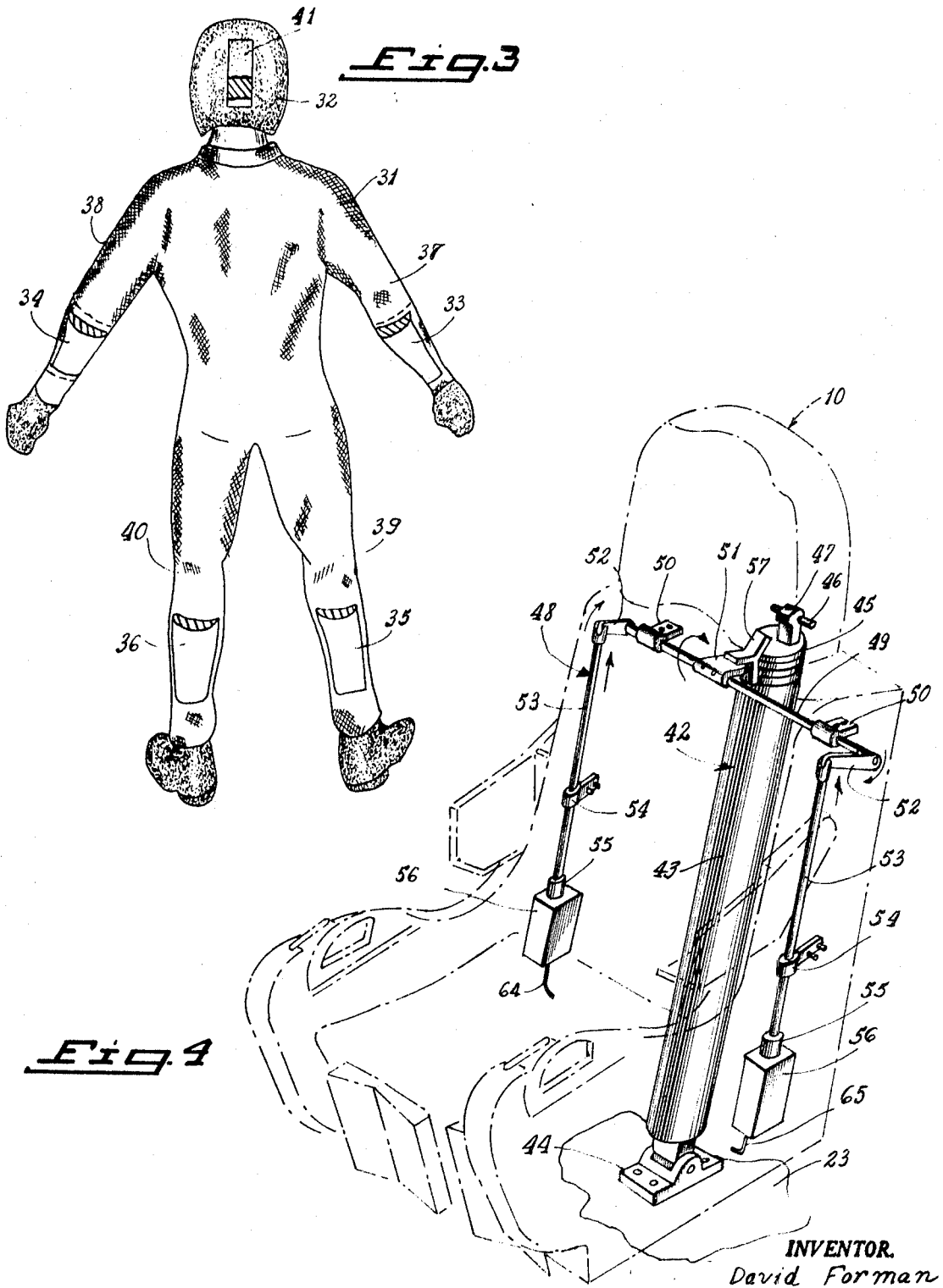

Patented Feb. 29, 1972
3,645,480
4 Sheets-Sheet 3
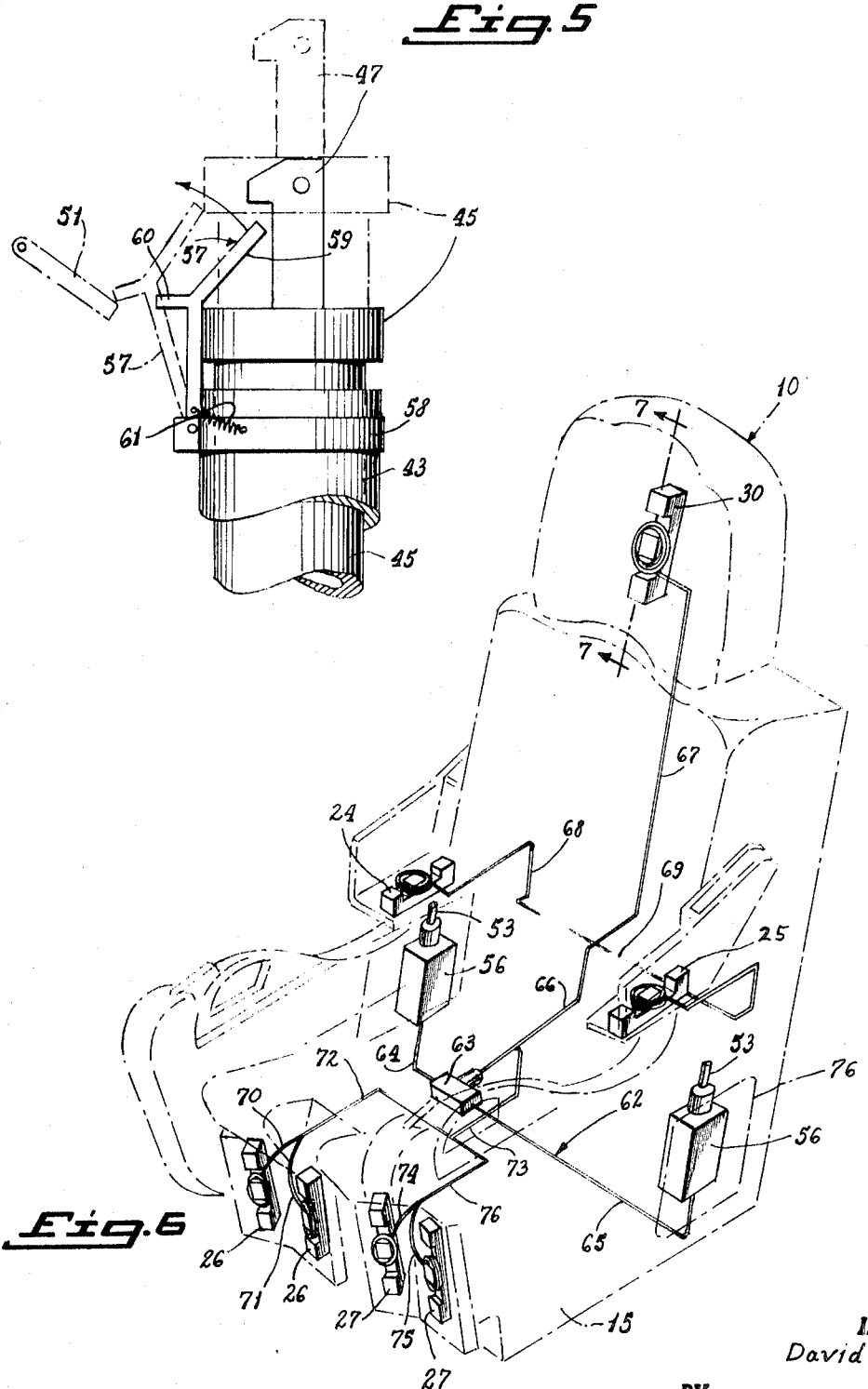
INVENTOR.
David Forman
BY Michael W. York
Attorney Patented Feb. 29, 1972

INVENTOR.
David Forman

BY Michael W. York

Attorney

VEHICLE SEAT RESTRAINING SYSTEM

This invention relates to vehicle seat restraining systems and more particularly to a vehicle seat restraining system that utilizes one or more electromagnets to secure an occupant to the vehicle seat.

With modern high-performance aircraft that have ejection seats it is important that the airman or occupant of the seat be secured to the seat during ejection from the aircraft so that the individual is not subject to injury during ejection. It is also important that any such securing or restraining system does not unnecessarily interfere with the movements of the occupant during normal aircraft operation. At the same time it is important that any such system be easily activated during an emergency so that the occupant can readily escape from the aircraft. With ejection seats it is also particularly important that some conveniently activated means be provided for securing the occupant's legs and arms to the seat during ejection so that the occupant's limbs are not subjected to injury.

Modern high-speed vehicles such as automobiles and the like also require an effective means to secure an individual to the vehicle seat in order to prevent the occupant of the seat from being separated from the seat upon impact when the vehicle is involved in an accident or when the vehicle is subjected to an abrupt stop. It has been shown that if an occupant is not secured to the vehicle seat when the vehicle is involved in an accident or is subjected to an abrupt stop that the occupant is much more likely to be injured than if the occupant is securely connected to the seat.

Present seat-restraining systems employ various types of belts or straps and associated buckles to secure the occupant to the vehicle seat. Unfortunately, these types of restraining systems that incorporate belts and the like must usually be worn and be tight continuously during vehicle operation since usually there is insufficient time to activate or tighten these belts when they are needed. Since these belts must be tight continuously they may be uncomfortable to use and they may unduly restrict the occupant of the seat. In view of this the seat occupant may fail to properly utilize these seat restraining systems.

The present invention overcomes these deficiencies and provides a vehicle seat restraining system that is easy to use that does not unnecessarily interfere with the occupant's movements during normal vehicle operation.

It is therefore an object of the present invention to provide a vehicle seat restraining system that assists in protecting the occupant from injury.

It is an object of the present invention to provide a vehicle seat restraining system that permits an individual to be readily secured to the vehicle seat.

It is an object of the present invention to provide a vehicle seat restraining system that does not unduly restrict the movements of the occupant of the seat prior to activation of the vehicle seat restraining system.

It is also an object of the present invention to provide a vehicle seat restraining system that can be used to secure an occupant to an aircraft ejection seat during ejection.

The present invention provides a vehicle seat restraining system for restraining an occupant to the vehicle seat that has magnetic means located on the vehicle seat for magnetically restraining the occupant to the vehicle seat.

In order that the invention may be more clearly set forth and better understood, reference is made to the accompanying drawings in which:

FIG. 1 is a perspective view of an occupant and an aircraft ejection seat having a restraining system that embodies the features of the present invention;

FIG. 2 is an enlarged perspective view of the seat illustrated in FIG. 1 with certain parts broken away;

FIG. 3 is a rear view of the seat occupant illustrated in FIG. 1; in a standing position FIG. 4 is a perspective view of the structure illustrated in FIG. 2 with the seat in phantom illustrating the battery-activating system that forms part of the magnet-energizing system of the invention;

FIG. 5 is an enlarged side view of part of the battery-activating system illustrated in FIG. 4;

FIG. 6 is a perspective view of the structure illustrated in FIG. 2 with the seat in phantom illustrating the electrical system that forms part of the magnet-energizing system of the invention;

Figure 7:
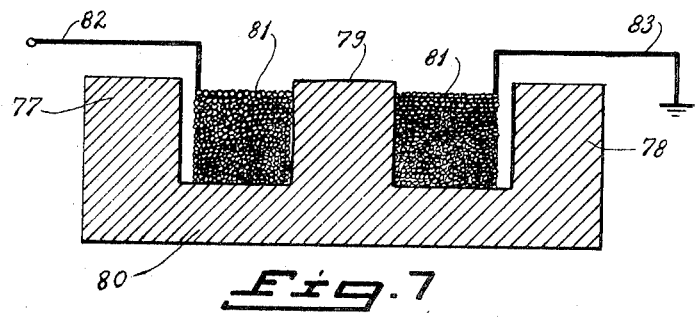
FIG. 7 is a sectional view of one of the electromagnets illustrated in FIG. 6, taken on the line 7—7 thereof.

Referring to FIGS. 1 through 3 there is illustrated an aircraft ejection seat 10 and an occupant of the seat that are equipped with the restraining system of this invention. The seat 10 comprises a bucket 11 that has a seat bottom 12 and a seat back 13 that are connected to a right seat side panel 14 and a left seat side panel 15. A head rest 16 that has a curved front surface is connected to the top of the seat back 13. A right armrest 17 and a left armrest 18 that are adapted to receive the arms of the occupant are connected respectively to the right and left seat side panels 14 and 15. A right ejection-activating handle 19 and a left ejection-activating handle 20 for activating the ejection seat system are connected respectively to the upper forward portion of the right and left seat side panels 14 and 15. The seat 10 is slidably mounted on ejection guide rails 21 that are located on each side of the seat by means of seat-mounting blocks 22 that are attached to the rear portion of the right and left seat panels 14 and 15 and slide within the U-shaped channel of the ejection guide rails. The lower ends of ejection guide rails 21 are securely fastened to the cockpit floor 23 so that upon activation of the ejection system the seat moves upward and is guided by the rails during the initial portion of its upward travel during ejection from the aircraft.

Magnetic means for restraining the occupant's arms comprising a right arm-restraining electromagnet 24 and a left arm-restraining electromagnet 25 are located on and connected respectively to the right and left armrests 17 and 18. Magnetic means for restraining the occupant's legs comprising a pair of right leg-restraining electromagnets 26 and a pair of left leg-restraining electromagnets 27 are located on and connected respectively to a right leg-restraining rest 28 and a left leg-restraining rest 29 that are connected to the front end of the seat bottom 12. The leg-restraining rests 28 and 29 have a shallow V-shaped surface that is adapted to receive the legs of the occupant and assist in preventing lateral movement of the legs. The paired right and left leg electromagnets 26 and 27 also have their poles facing slightly inward toward the other electromagnet that makes up the pair so that upon activation of the right and left leg electromagnet the attractive magnet force will tend to centralize and hold a magnetically attractive member within the central portion of the V-shaped restraining rests 28 and 29. Magnetic means for restraining the occupant's head comprising a head-restraining electromagnet 30 is located on and connected to the front of the headrest 16.

As illustrated in FIGS. 1 and 3 the airman that is to occupy the seat or the seat occupant wears a special flight suit 31 and a special helmet 32. Magnetically attractive means are attached to the flight suit 31 and the helmet 32. The magnetically attractive means are adapted to cooperate with the magnetic means located on the seat 10 for restraining the occupant to the seat. The magnetically attractive means attached to the flight suit 31 comprise a right arm magnetically attractive member 33, a left arm magnetically attractive member 34, a right leg magnetically attractive member 35, and a left leg magnetically attractive member 36. The right arm magnetically attractive member 33 and the left arm magnetically attractive member 34 are attached respectively to the forward portion of the right sleeve 37 and left sleeve 38 of the flight suit 31. The right leg magnetically attractive member 35 and the left leg magnetically attractive member 36 are respectively attached to the lower portion of the right leg 39 and left leg 40 of the flight suit 31.

The right and left arm magnetically attractive members 33 and 34 are adapted to cooperate respectively with the right and left arm-restraining electromagnets so that when the arm electromagnets are energized the right arm magnetically attractive member 33 and the left arm magnetically attractive member 34 are pulled down respectively upon the right and left arm-restraining electromagnets 24 and 25 by the force of the magnetic fields generated by the arm-restraining electromagnets when the right and left arm magnetically attractive members are placed in proximity to the arm-restraining electromagnets. In a similar manner the right and left leg magnetically attractive members are adapted to cooperate with the leg-restraining electromagnets so that when the leg electromagnets are energized the right leg magnetically attractive member 35 and the left leg magnetically attractive member 36 are pulled respectively against the right and left leg-restraining electromagnets 26 and 27 by the force of the magnetic fields generated by the leg-restraining electromagnets when the right and left leg magnetic attractive members are placed in proximity to the leg-restraining electromagnets as the seat 10 is being ejected from the aircraft.

The magnetically attractive means that is attached to the helmet 32 comprises a helmet magnetically attractive member 41 that is securely attached to the back of the helmet. The helmet magnetically attractive member is adapted to cooperate with the head-restraining electromagnet 30 that is located in the forward surface of the headrest 16 so that when the head-restraining electromagnet is energized the helmet magnetically attractive member 41 is pulled back against the head-restraining electromagnet by the force of the magnet field generated by the head-restraining electromagnet when the helmet magnetic attractive member is placed in proximity to the head-restraining electromagnet.

The details of the magnet-energizing means for energizing the various electromagnets that are attached to the aircraft ejection seat 10 are illustrated in FIGS. 4 through 6. As illustrated in FIG. 4 the ejection seat 10 is connected to a catapult system 42 that comprises a catapult tube 43 that is connected at its lower end to the cockpit floor 23 by a bracket 44. The catapult system 42 also comprises an ejection seat rocket 45 that is slidably mounted within the catapult tube. The ejection seat rocket 45 is connected to the ejection seat 10 by means of a pin 46 that connects a projection 47 on the upper end of the rocket to the seat so that when the rocket is fired it pushes the seat in an upward direction. The magnet-energizing means includes battery-activating means that comprises a battery-activating system 48 for activating the batteries to energize the electromagnets. The battery-activating system 48 includes a round rod 49 that is rotatably mounted in a horizontal position within the seat by means of the brackets 50 that are attached to the seat 10. A triggering lever 51 is located near the center of the rod 49 and is rigidly secured to the rod with the lever extending rearward so that downward pressure on the triggering lever causes the rod to rotate in a clockwise direction. An initiating lever 52 is rigidly secured to each end of the rod 49 and extends forward from the rod so that as the rod is rotated clockwise the initiating levers pivot in an upward direction. An initiating rod 53 is pivotally connected to the forward end of each initiating lever 52 and each initiating rod is slidably mounted within the seat in a vertical position by means of an initiating rod-mounting bracket 54 that is connected to the seat 10. The lower end of each initiating rod 53 is connected to an initiator 55 of a thermal battery 56 so that upward movement of the initiating rods 53 activates the initiators 55 to energize the thermal batteries 56 to supply electrical power to the electromagnets. Only one of the batteries is needed to provide sufficient power to the electromagnets and the only purpose of the second battery is to insure that adequate electrical power is available in the event that one of the batteries should fail to function properly.

As best illustrated in FIG. 5, the battery-activating system includes a trigger member 57 that is adapted to contact the triggering lever 51 after the aircraft ejection system is activated. The trigger member 57 is pivotally connected at its lower end to a bracket 58 that surrounds and is attached to the upper end of the catapult tube 43. The trigger member 57 has a sloping projection 59 that is adapted to extend into the path of the rocket 45 prior to the rockets activation. The trigger member 57 has a projection 60 that extends outward from the sloping projection 59 that is adapted to engage the triggering lever 51 and push the lever downward upon activation and upward movement of the rocket 45 and the seat 10. The trigger member 57 is biased toward the catapult tube 43 and the rocket 45 by a tension spring 61 that is connected between the trigger member and the bracket 58 so that the sloping projection 59 extends over the top of the rocket prior to firing the rocket.

When the ejection seat rocket 45 is fired the rocket moves upward within the catapult tube 43 and the ejection seat 10 is pushed upward by the force of the rocket. AS the rocket 45 moves upward, the upper end of the rocket engages the sloping projection 59 of the trigger member 57 and this forces the trigger member outward so that the outward extending projection 60 engages the triggering lever 51 that is on the seat as the seat moves upward. Further upward movement of the seat 10 causes the trigger lever 51 to be pushed downward by the projection 60 as illustrated in phantom in FIG. 5. The downward movement of the triggering lever 51 causes the attached rod 49 to rotate in a clockwise direction so that the initiating levers 52 that are connected to the ends of the rod pivot in an upward direction. The upward movement of the initiating levers 52 pulls the initiating rods 53 upward which results in the initiators 55 being activated to cause the thermal batteries 56 to be activated.

As illustrated in FIG. 6 the magnet-energizing means for energizing the various electromagnets that are attached to the aircraft ejection seat 10 includes an electrical system 62 for transmitting electrical power from the thermal batteries 56 to the electromagnets. The thermal battery 56 that is located in the right side of the ejection seat 10 is connected to an interrupter timer 63 through a conductor 64. The thermal battery 56 that is located in the left side of the ejection seat 10 is connected to the interrupter timer 63 through a conductor 65. The interrupter timer 63 is in turn connected to a common conductor 66. The purpose of the interrupter timer 63 is to electrically disconnect the conductor 66 from the conductors 64 and 65 that are connected to the thermal batteries 56 at a preselected time after electric current has been flowing through the timer from the thermal batteries. Such an interrupter timer is desirable in aircraft ejection seats that utilize this invention since this permits the power to be cut off from the batteries 56 to the various electromagnets located on the ejection seat 10 so that after the ejection seat and the occupant have been ejected from the aircraft the occupant is no longer restrained to the ejection seat by the electromagnets and can thus release himself from the seat once he is clear of the aircraft.

The coil of the head-restraining electromagnet 30 is connected to the common conductor 66 through a conductor 67. The coil of the right arm-restraining electromagnet 24 is connected to the common conductor 66 through a conductor 68 and in a similar manner the coil of the left arm-restraining electromagnetic 25 is connected to the common conductor 66 through a conductor 69. The coils of the paired right leg-restraining electromagnets 26 are connected through conductors 70 and 71 with a common conductor 72 which is in turn connected to the conductor 73 which is in turn connected to the common conductor 66. In a similar manner the coils of the paired left leg-restraining electromagnetics 27 are connected through conductors 74 and 75 with a common conductor 76 which is in turn connected to the conductor 73 which is in turn connected to the common conductor 66. The ground terminals or leads of the coils of the electromagnetics are connected to the seat frame that serves as a common ground and the ground or negative terminals of the thermal batteries 56 are also connected to the seat frame.

When the thermal batteries are activated electric current flows from the thermal battery located in the right side of the seat 10 through the conductor 64 to the interrupter timer 63 and in a similar manner electric current flows from the thermal battery located in the left side of the seat through the conductor 65 to the interrupter timer. From the interrupter timer 63 electric current flows through the common conductor 66, through the conductor 67 to the coil of the head-restraining electromagnet 30 to energize the head-restraining electromagnet. From the interrupter timer 63 current flows through the common conductor 66, respectively through the conductors 68 and 69 to the windings of the right arm-restraining electromagnet 24 and the windings of the left arm-restraining electromagnet 25 to energize the arm-restraining electromagnets. Electric current also flows from the interrupter timer 63 through the common conductor 66, through the conductor 73, through the conductor 72, through the conductors 70 and 71 to the coils of the paired right leg-restraining electromagnets 26 to energize the right leg electromagnets. From the interrupter timer 63, electric current also flows through the common conductor 66, through the conductor 73 through the conductor 76, through the conductors 74 and 75 to the coils of the paired left leg-restraining electromagnets 27 to energize the left leg electromagnets. AFter the electric current flows through the coils of the electromagnets 24, 25, 26, 27, and 30 the current flows through the frame of the seat to the ground or negative terminals of the batteries 56. AFter the ejection seat 10 has been ejected from the aircraft the timer 63 disconnects the conductors 64 and 65 that are connected to the thermal batteries 56 from the common conductor 66 so that current no longer flows through the coils of the electromagnets so that the electromagnets are deenergized. Preferably the interrupter timer 63 should be adapted to disconnect the thermal batteries 56 within about 1 second after the electric current from the thermal batteries has begun to flow through the interrupter timer to the various electromagnets. In order to service the thermal batteries, battery access panels 76 are provided in the right-seat side panel 14 and in the left-seat side panel 15 to provide access to the thermal batteries 56 so that the batteries can be tested and replaced if necessary during the performance of aircraft maintenance.

A typical cross section of the electromagnets used on the aircraft ejection seat 10 is illustrated in FIG. 7. The electromagnet has a substantially E-shaped cross section and has two end poles 77 and 78 and a center pole 79 that lies between the two end poles. An underbar 80 joins the poles 77, 78, and 79. An excitation or magnetizing coil 81 is wrapped around the center pole 79 and the coil has an input lead 82 that is adapted to be connected to the appropriate conductor 67, 68, 69, 70, 71, 74, or 75 of the electrical system. The coil 81 also has a ground lead 83 that is connected to the frame of the seat 10. The poles 77, 78, and 79 and the connecting underbar 80 are preferably made from soft iron or some other suitable ferromagnetic material.

In order to utilize the embodiment of the invention illustrated in FIGS. 1 through 7 to eject from an aircraft, the occupant of the ejection seat 10 that is wearing the special flight suit 31 and the helmet 32 places his right forearm in the right armrest 17 and his left forearm in the left armrest 18 and pushes his helmet back against the headrest 16 as illustrated in FIG. 1. Then the occupant of the seat pulls one or both of the ejection-activating handles 19 and 20 upward with the appropriate hand to initiate the firing of the rocket 45 by means that are not shown but are familiar to those skilled in the art. The rocket 45 and the attached seat 10 then move upward and the rocket pushes the trigger member 57 into position to engage the triggering lever 51. Further upward movement of the seat 10 results in the triggering lever 51 being pushed downward to cause activation of the thermal batteries 56. The activation of the thermal batteries results in energization of the electromagnets. The energization and the resulting generation of magnetic force by the right arm-restraining electromagnet 24, the left arm-restraining electromagnet 25, the right leg-restraining electromagnets 26, the left leg-restraining electromagnets 27, and the head-restraining electromagnet 30 pulls and restrains respectively the right arm magnetically attractive member 33, the left arm magnetically attractive member 34, the right leg magnetically attractive member 35, the left leg magnetically attractive member 36 and the head magnetically attractive member 41 and this results in the securing of the arms, legs and the head of the occupant to the seat 10 as the seat moves upward during the ejection of the seat from the aircraft.

At a preset time after electric current has been flowing through the interrupter timer 63 and after the seat has ejected from the aircraft, the interrupter timer electrically disconnects the electromagnets from the thermal batteries 56 and thus the electromagnets are deenergized and the electromagnets no longer create magnetic forces that attract the magnetically attractive members to the electromagnets. Consequently, the occupant's head, arms, and legs are no longer secured to the ejection seat 10 and the occupant can release himself from the seat by releasing any other restraining system, if any, such as a lap belt. It will be appreciated that since thermal batteries only generate an electric current for a comparatively short period of time, the interrupter timer may not be necessary if the proper type of thermal battery is utilized. If a thermal battery is selected that only generates a useful electric current for about 1 second, then the interrupter timer 63 is unnecessary since the batteries in themselves will cease to supply electric current to energize the electromagnets after the ejection seat and the occupant have ejected from the aircraft.

Figure 8:
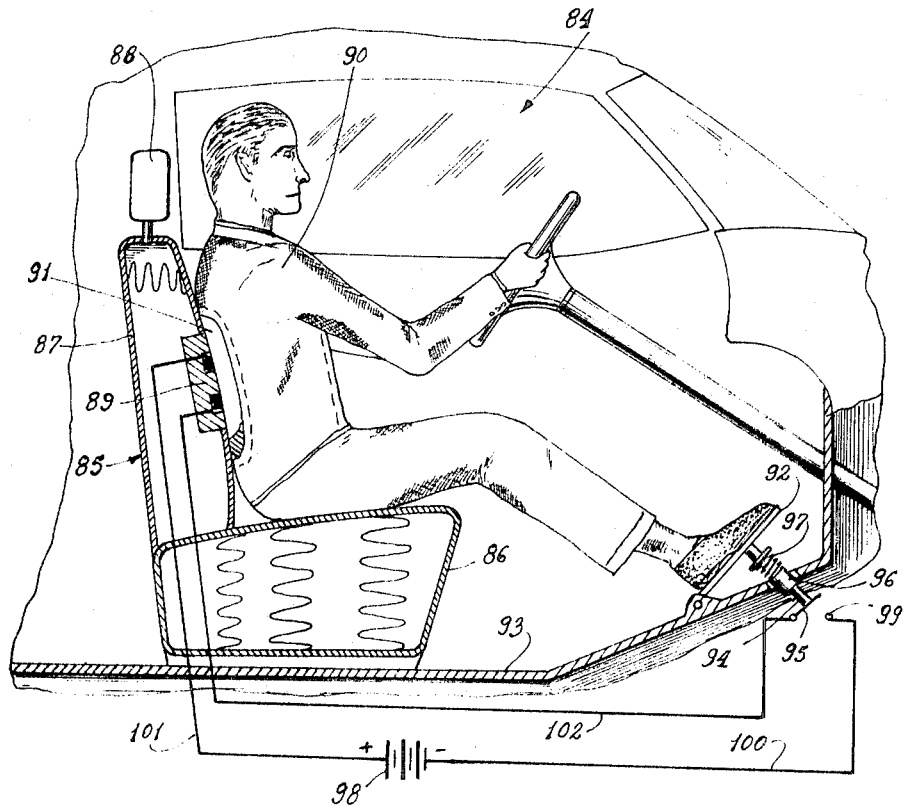
FIG. 8 is a schematic view of a portion of a land vehicle equipped with a restraining system that forms an additional embodiment of the present invention.

An additional embodiment of the invention is shown in FIG. 8. In FIG. 8 a portion of the operator's compartment 84 of a vehicle such as an automobile, bus or the like is illustrated with the occupant or operator occupying a seat 85. The seat 85 comprises a seat bottom 86, a seat back 87 that is connected to the rear of the seat bottom and a headrest 88 that is attached to the upper edge of the seat back. Magnetic means comprising an electromagnet 89 is located on the front of the seat back 87 for magnetically restraining the occupant to the vehicle seat 85. The occupant wears a jacket 90 or a similar garment that has a magnetically attractive member 91 attached to the back of the jacket or the garment. The magnetically attractive member 91 is adapted to cooperate with the electromagnet 89 that is located on the seat back 87 to secure the occupant to the vehicle seat 85 when the electromagnet is energized. A brake pedal 92 is pivotally connected to the floor 93 of the operator's compartment and is connected to a push rod 94 that is adapted to close a switch 95 to energize the electromagnet 89 when the brake pedal is fully depressed. A brake-activating member 96 that is connected to the vehicle braking mechanism (not shown) is slidably mounted on the push rod 94. A compression spring 97 that is connected to the brake-activating member 96 is mounted around the push rod 94 between the pedal 92 and the brake-activating member. A power source 98 for energizing the electromagnet 89 is connected to a terminal 99 associated with the switch 95 by means of the conductor 100. The battery 98 or other such power source is in turn connected through the conductor 101 to the coil of the electromagnet 89 and the coil of the electromagnet is in turn connected through the conductor 102 to the switch 95.

In order to utilize the embodiment of the invention illustrated in FIG. 8 the operator merely pushes down sharply on the brake pedal 92 and this results in the pedal making contact with the compression spring 97 which in turn pushes the brake activating member 96 forward to activate the vehicle's braking system. Further pressure on the brake pedal 92 results in the compression of the compression spring 97 so that the further movement of the pedal results in the push rod 94 being pushed forward to close the switch 95. The closing of the switch 95 causes electric current to flow from the power source 98 through the conductor 101 to the coil of the electromagnet 89 to energize the electromagnet. From the coil of the electromagnet current flows through the conductor 102, through the closed switch 95, through the conductor 100 to the negative terminal of the power source 98. The energization of the electromagnet 89 results in the generation of a magnet field that pulls the magnetically attractive member 91 that is attached to the jacket 90 to the electromagnet and this results in the securing of the operator to the seat 85. Upon release of the pedal 92 the switch 95 is opened and electric current no longer flows through the coil of the electromagnet 89 and thus the operator is no longer restrained to the seat 85. Normally the operator will only supply sufficient pressure to the pedal 92 to operate the braking system. However, when an emergency arises further pressure will be supplied to the pedal to close the switch 95 and activate the restraining system. It will be appreciated that a number of electromagnets can be connected in circuit with the electromagnet 89 to restrain a number of passengers to their respective vehicle seats.

The types of thermal batteries that can be utilized to supply electrical power to the electromagnets located on the aircraft ejection seat 10 include thermal batteries that supply a 40-amp current at 28 volts for one second that are available from Eagle Picher Industries Incorporated of Joplin, Missouri and from Catalyst Research Corporation of Baltimore, Maryland. The type of interrupter timers that can be utilized with the electrical circuit for disconnecting the electromagnets on the aircraft ejection seat from the thermal batteries include an interrupter timer that handles a current of 40 amps for 1 second that is available from Holex Corporation of Hollister, California. Various types of batteries can be used to supply the electrical current to the electromagnet of the embodiment of the invention illustrated in FIG. 8 and in some instances the electrical generator on the vehicle may be capable of energizing the electromagnet. The power supply or battery should preferably be capable of supplying at least a current of about 40 amps during the period of time that the occupant is likely to be faced with an emergency such as an impending collision or the like. The various magnetically attractive members should comprise a soft iron or other material that is capable of being readily attracted by a magnet.

Although the invention has been described with reference to certain preferred embodiments, it will be understood that variations and modifications may be made within the spirit and scope of the invention as defined in the appended claims.

What is claimed is:

1. A vehicle seat restraining system for restraining at least a portion of the body of an occupant to the vehicle seat comprising magnetic means located on the vehicle seat for magnetically restraining at least a portion of the body of the occupant to the vehicle seat and magnetically attractive means adapted to be attached to the occupant for cooperating with said magnetic means for restraining at least a portion of the body of the occupant to the vehicle seat.

2. The vehicle seat restraining system of claim 1 wherein said magnetic means comprises at least one electromagnet.

3. The vehicle seat restraining system of claim 2 including magnet-energizing means connected to said electromagnet or electromagnets for energizing said electromagnet or electromagnets.

4. The vehicle seat restraining system of claim 3 wherein said magnet-energizing means includes a source of electrical power.

5. The vehicle seat restraining system of claim 4 including switching means for connecting said power source to said electromagnets.

6. The vehicle seat restraining system of claim 4 wherein said vehicle seat is an aircraft ejection seat and said magnet energizing means is adapted to be activated upon activation of said ejection seat.

7. The vehicle seat restraining system of claim 6 including interrupter timing means for disconnecting said electromagnets from said power source at a preset time after energization of said electromagnets.

8. The vehicle seat restraining system of claim 6 wherein said power source comprises a thermal battery.

9. The vehicle seat restraining system of claim 6 wherein said magnetic means and said magnetically attractive means are adapted to secure the legs and arms of said the occupant to said aircraft ejection seat.

10. The vehicle seat restraining system of claim 9 wherein said magnetic means and said magnetically attractive means are also adapted to secure the head of the occupant to said aircraft-ejection seat.

11. An aircraft ejection arrangement for an aircraft occupant comprising an ejection seat, means connected to said seat for ejecting said seat from the aircraft, electromagnetic means connected to said seat for electromagnetically securing the legs of an occupant to said seat, magnetically attractive means adapted to be attached to the occupant for cooperating with said electromagnetic means for securing the legs of the occupant to said seat, and means connected to said electromagnetic means for supplying electrical power to energize said electromagnetic means.

12. The aircraft ejection arrangement of claim 11 further comprising arm electromagnetic means connected to said seat for electromagnetically securing the arms of the occupant to said seat, arm magnetically attractive means adapted to be attached to the occupant for cooperating with said arm electromagnetic means for securing the arms of the occupant to said seat and wherein said means for supplying electrical power is also connected to said arm electromagnetic means to energize said arm electromagnetic means.

13. The aircraft ejection arrangement of claim 12 wherein said ejection seat has a headrest and further comprising head electromagnetic means connected to said headrest for electromagnetically securing the head of the occupant to said headrest, magnetically attractive means adapted to be attached to the head of the occupant for cooperating with said head electromagnetic means for securing the head of the occupant to said headrest and wherein said means for supplying electrical power is also connected to said head electromagnetic means to energize said head electromagnetic means.

* * * * *